(12) United States Patent
Challener et al.

(10) Patent No.: US 8,539,572 B2
(45) Date of Patent: Sep. 17, 2013

(54) SYSTEM AND METHOD FOR SECURE USAGE OF PERIPHERAL DEVICES USING SHARED SECRETS

(75) Inventors: David Carroll Challener, Raleigh, NC (US); Daryl Cromer, Cary, NC (US); Philip John Jakes, Durham, NC (US); Howard Jeffrey Locker, Cary, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1139 days.

(21) Appl. No.: 11/934,829

(22) Filed: Nov. 5, 2007

(65) Prior Publication Data

US 2009/0119785 A1    May 7, 2009

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)
*G11C 7/00* (2006.01)
*H04N 7/16* (2011.01)
*G06F 15/16* (2006.01)

(52) U.S. Cl.
USPC .............. 726/17; 726/27; 726/34; 709/227

(58) Field of Classification Search
USPC ...................... 726/2, 16, 17, 27, 34
See application file for complete search history.

(56) References Cited

U.S. PATENT DOCUMENTS

| 5,359,660 | A   | * | 10/1994 | Clark et al. ................. 726/3 |
| 6,353,449 | B1  | * | 3/2002  | Gregg et al. ............. 715/762 |
| 6,599,139 | B1  | * | 7/2003  | Hunter ..................... 439/133 |
| 2003/0191960 | A1 | * | 10/2003 | Hung-yi .................. 713/200 |
| 2005/0137983 | A1 | * | 6/2005  | Bells ....................... 705/51 |
| 2005/0151995 | A1 | * | 7/2005  | Hauser et al. .......... 358/1.15 |
| 2006/0026693 | A1 | * | 2/2006  | Bade et al. ............. 726/34 |
| 2007/0074284 | A1 | * | 3/2007  | Woog ..................... 726/16 |
| 2007/0088947 | A1 | * | 4/2007  | Cross et al. ............ 713/165 |
| 2007/0214369 | A1 | * | 9/2007  | Roberts et al. .......... 713/192 |
| 2009/0094349 | A1 | * | 4/2009  | Smith ..................... 709/220 |

FOREIGN PATENT DOCUMENTS

EP        0044870 A1 *  2/1982

* cited by examiner

*Primary Examiner* — Edan Orgad
*Assistant Examiner* — Jahangir Kabir
(74) *Attorney, Agent, or Firm* — John L. Rogitz; John M. Rogitz

(57) ABSTRACT

A system, method, and program product is provided that establishes a shared secret between a computer system and a peripheral device such as a removable nonvolatile storage device or a printer. After establishing the shared secret, the peripheral device is locked. After the peripheral device is locked, an unlock request is received and the shared secret is sent to the peripheral device. The peripheral device then attempts to verify the shared secret. If the shared secret is successfully verified, then the peripheral device is unlocked allowing use of the device by using an encryption key that is made available by the verified shared secret. On the other hand, if the shared secret is not verified, then the peripheral device remains locked and use of the device is prevented.

17 Claims, 9 Drawing Sheets

SYSTEM AND METHOD FOR SECURE USAGE OF PERIPHERAL DEVICES USING SHARED SECRETS

BACKGROUND OF THE INVENTION

1. Technical Field

The present invention relates to a system and method that controls access to peripheral devices. More particularly, the present invention relates to a system and method that shares a secret between the peripheral device and a computer system to protect usage of the peripheral device.

2. Description of the Related Art

Peripheral devices, such as removable nonvolatile storage devices, are increasingly popular, often because of their increased performance and decreased cost. These devices, such as Universal Serial Bus (USB) drives, are often used to provide external storage to a computer system used to backup data on the computer system. Other peripherals, such as printers, provide increased functionality to a computer system. Traditionally, these peripheral devices are connected to a user's computer system, such as a laptop computer system, and they often remain attached to the computer system even when the user is no longer using the computer system.

For example, a user might attach a USB drive in his or her computer system and schedule a backup of important documents or data that are copied from the computer system to the removable nonvolatile storage device on a periodic basis. Backup of documents and other data generally works better when the computer system is not being used by the user. First, if a document is currently being used by the user, it might not be able to be copied to the removable nonvolatile storage device. Second, a backup application often slows down a computer system making the system less responsive to the user. For these reasons, backup applications are often scheduled for time periods when the user is not using the system. If a user generally uses the system from 8:00 AM to 5:00 PM, a backup might be scheduled at an off-time, such as 3:00 AM, when the user is not likely to be using the system.

A challenge of using peripheral devices, such as removable nonvolatile storage devices and printers, is that they can be accessed by unauthorized users. For example, a challenge of using removable nonvolatile storage devices to backup documents and data is that the removable nonvolatile storage device is vulnerable to being removed from the system and the data stolen from the removable nonvolatile storage device. This is especially troublesome when the documents and data being backed up contain confidential or sensitive information. One approach to protecting the removable nonvolatile storage device is to lock the removable nonvolatile storage device in a secured housing, such as inside a locked desk, with the removable nonvolatile storage device being attached to the computer system using a longer cable. A challenge of this approach is that the secured housing might not always be available, such as when the user is traveling and attaches the removable nonvolatile storage device to his or her laptop computer system in a remote location, such as a hotel room. A second approach to protecting the removable nonvolatile storage device is to remove the removable nonvolatile storage device when the user is no longer using the computer system. A challenge of this approach is that the backup application would have to run when the user is at work using the system, potentially causing problems discussed above. Another challenge to this second approach is that the user might not remember to remove the removable nonvolatile storage device from the system at the end of the day. This is especially true when the connection is in an obscure location, such as in the back of a computer system where it might not be visible to the user.

SUMMARY

It has been discovered that the aforementioned challenges are resolved using a system, method and computer program product that establishes a shared secret between a computer system and a peripheral device, such as a removable nonvolatile storage device or a printer. At some point after establishing the shared secret the peripheral device is locked. After the peripheral device is locked, an unlock request is received and the shared secret is sent to the peripheral device. The peripheral device then attempts to verify the shared secret. If the shared secret is successfully verified, then the peripheral device is unlocked allowing accesses to the device by using an encryption key that is made available by the verified shared secret. On the other hand, if the shared secret is not verified, then the peripheral device remains locked and access to the device is prevented. In a further embodiment, the encryption key is stored in an encryption key file on the peripheral device, and the encryption key file is encrypted using the shared secret.

In one embodiment, a pass phrase is received at the computer system. The shared secret is then generated by processing the received pass phrase using a hashing algorithm. The shared secret is a result of the hashing algorithm.

In another embodiment, an inactivity timer is set at the peripheral device, the inactivity timer including an inactivity time period threshold. After the peripheral device is unlocked, access requests are received at the peripheral device from the computer system. When an access request is received, a current timestamp corresponding to the access request is compared to a last used timestamp indicating when the peripheral device was last accessed, resulting in a current time period. If this current time period is within (e.g., less than) the inactivity time period threshold, then the last used timestamp is reset to be equal to the current timestamp and access is allowed to the peripheral device. On the other hand, if the current time period is outside (e.g., greater than) the inactivity time period threshold, then the shared secret is requested from the computer system (e.g., a user or a software application, such as a backup application). If the received shared secret is verified, then access to the peripheral device is allowed. However, if the correct shared secret is not received, then access to the removable nonvolatile storage device is prevented.

In one embodiment, after the peripheral device is unlocked, the peripheral device periodically polls the computer system in order to determine whether the computer system is connected to the peripheral device. If the computer system is unavailable, then the peripheral device is locked.

In another embodiment, a timelock is set at the peripheral device. The timelock indicates one or more timelock periods during which the peripheral device is in a locked state. After the removable nonvolatile storage device has been unlocked, access requests are received at the peripheral device. A current time is received at the peripheral device and this time is compared to the timelock periods. If the current time falls within one of the timelock periods, then the shared secret is requested before access to the peripheral device is allowed. If the current time does not fall within one of the timelock periods, then access is provided without having to provide the shared secret.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
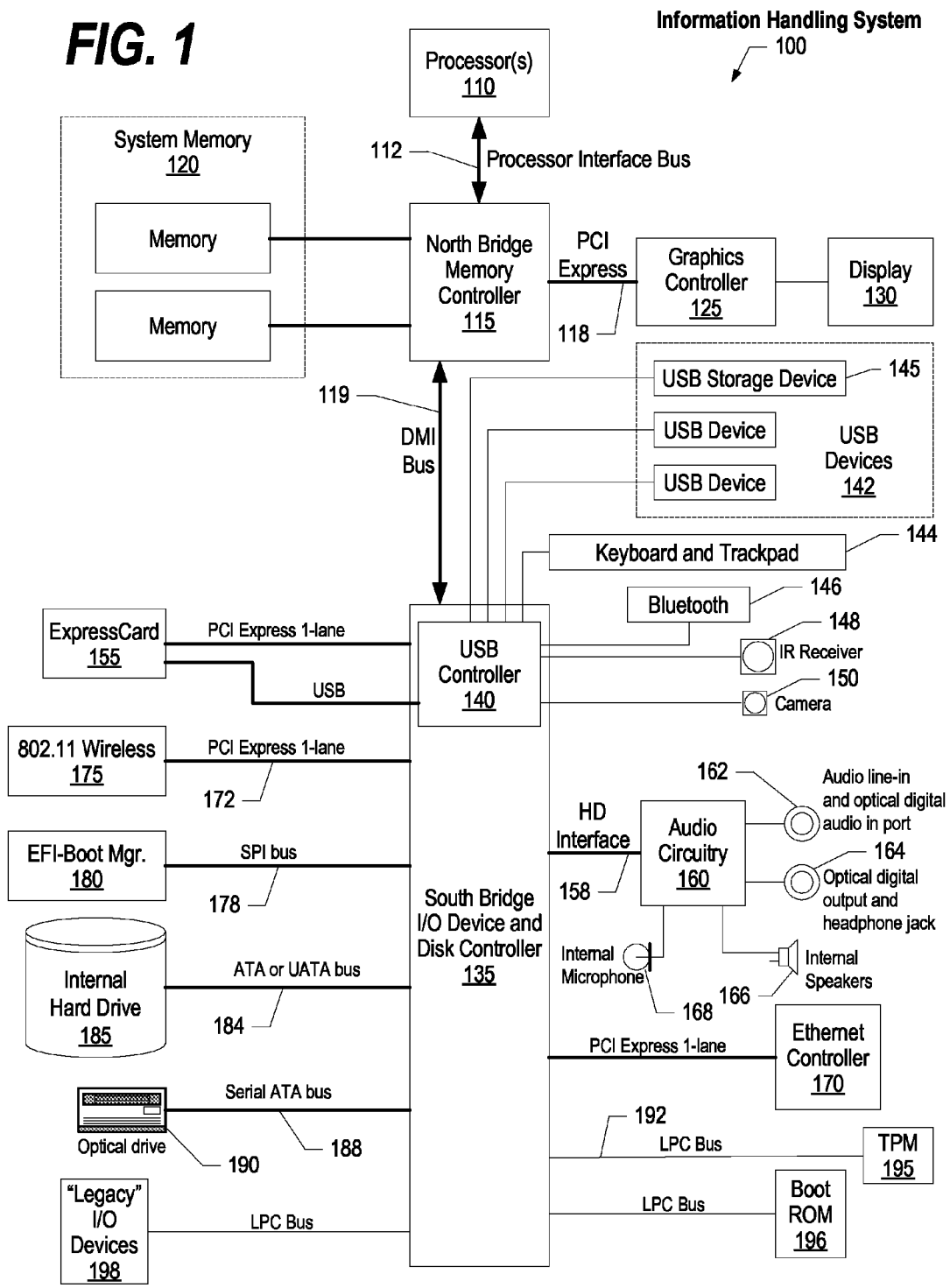
FIG. 1 is a block diagram of a data processing system in which the methods described herein can be implemented.
Figure 2:
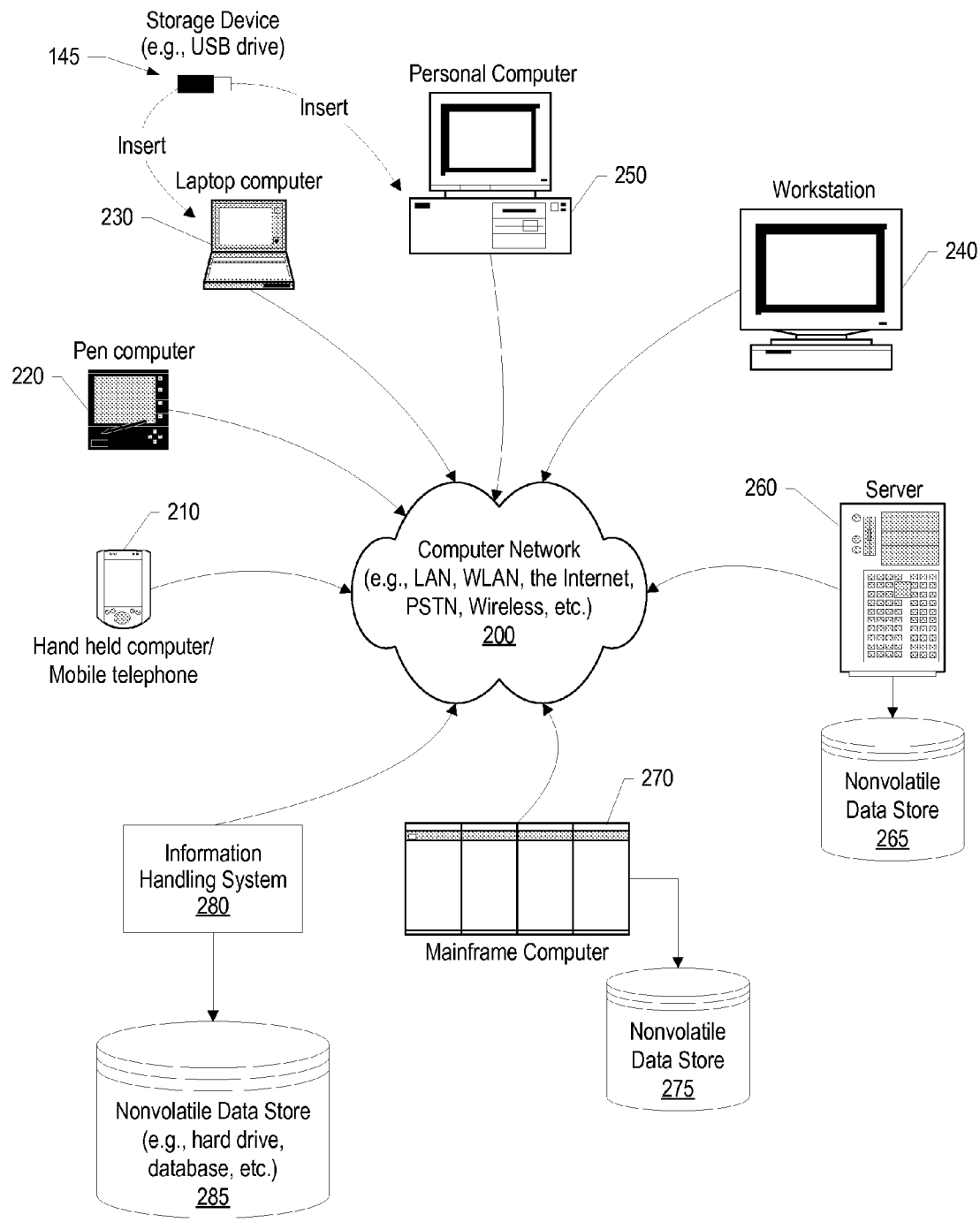
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
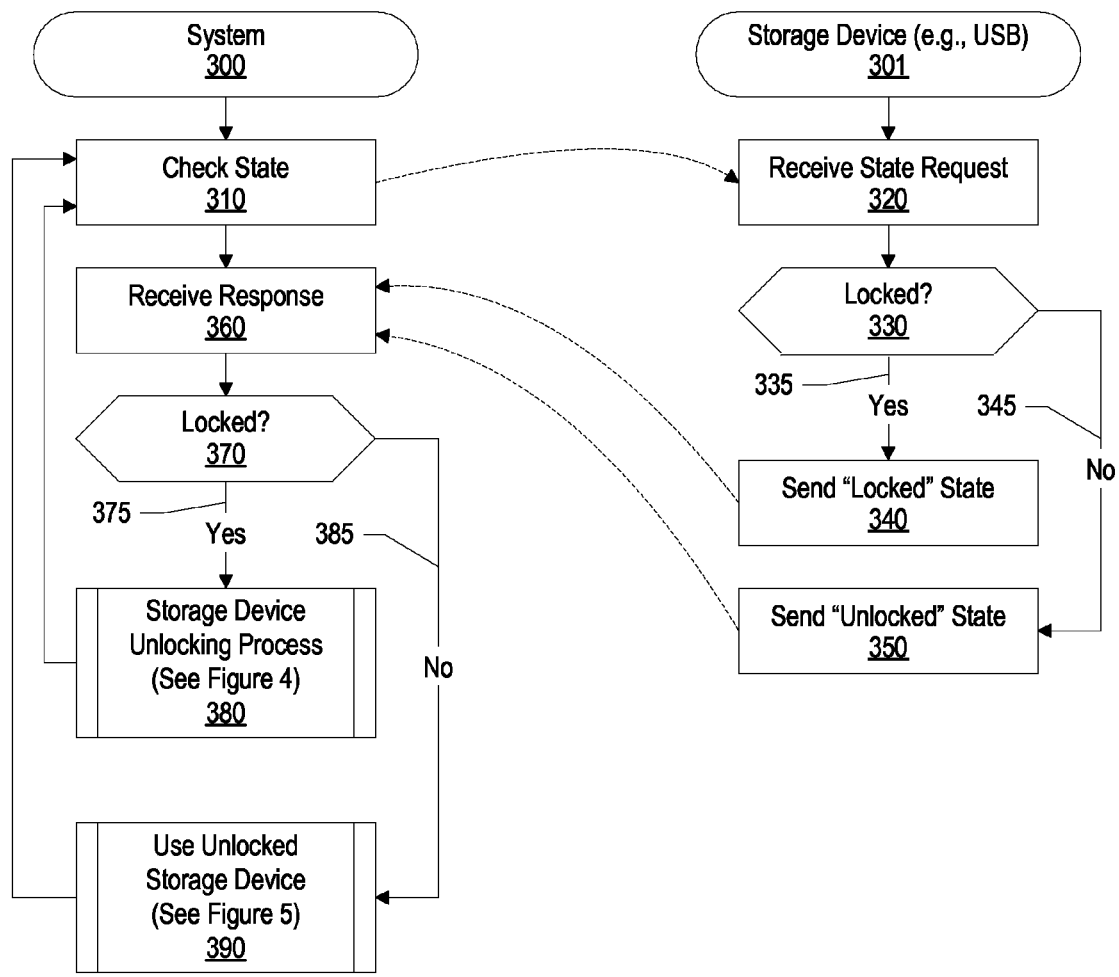
FIG. 3 is a high level flowchart showing use of a secured peripheral device by a computer system.

FIG. 3 is a high level flowchart showing use of a peripheral device, such as a secured removable nonvolatile storage device, by a computer system. FIGS. 3-9 depict a removable nonvolatile storage device as the peripheral device. Those of skill in the art will appreciate that other types of peripheral devices, such as printers, plotters, scanners, and the like, could be used in place of the removable nonvolatile storage devices depicted in FIGS. 3-9. While removable nonvolatile storage devices are one example of peripheral devices, many other types of peripheral devices, such as those mentioned above, can be utilized and accessed using the techniques described herein.

Computer system processing is shown commencing at 300 whereupon, at step 310, the computer system checks the current state of the removable nonvolatile storage device by sending a state request to the device. Removable nonvolatile storage device processing is shown commencing at 301 whereupon, at step 320, the removable nonvolatile storage device receives the state request. The removable nonvolatile storage device determines whether the removable nonvolatile storage device is currently in a locked state (decision 330). In one embodiment, when the removable nonvolatile storage device is in a locked state, the encryption key used to decrypt files stored on the removable nonvolatile storage device is inaccessible (e.g., has been deleted or erased). Therefore, encrypted files stored on the removable nonvolatile storage device that is in a locked state are inaccessible. If the removable nonvolatile storage device is currently in a locked state, then decision 330 branches to "yes" branch 335 whereupon, at step 340, the removable nonvolatile storage device returns a reply message to the computer system indicating that the removable nonvolatile storage device is currently locked. On the other hand, if the removable nonvolatile storage device has been unlocked (or has never been locked), then decision 330 branches to "no" branch 345 whereupon, at step 350, a reply message is returned to the computer system indicating that the removable nonvolatile storage device is currently unlocked.

Returning to computer system processing, at step 360 the computer system receives the response from the removable nonvolatile storage device. A determination is made as to whether the response indicates that the removable nonvolatile storage device is currently locked (decision 370). If the removable nonvolatile storage device returned a reply indicating that the removable nonvolatile storage device is currently locked, then decision 370 branches to "yes" branch 375 whereupon, at predefined process 380, the computer system attempts to unlock the removable nonvolatile storage device (see FIG. 4 and corresponding text for details regarding the unlocking process). After the unlocking process takes place, predefined process loops back to check the state of the removable nonvolatile storage device (step 310) to see if the removable nonvolatile storage device has been unlocked. On the other hand, if the removable nonvolatile storage device returned a reply indicating that the removable nonvolatile storage device is currently unlocked, then decision 370 branches to "no" branch 385 whereupon, at predefined process 390 the computer system uses the unlocked removable nonvolatile storage device (see FIG. 5 and corresponding text for details regarding the usage of an unlocked removable nonvolatile storage device). As will be explained in further detail below, after the computer system uses the unlocked removable nonvolatile storage device, processing loops back to check the state of the removable nonvolatile storage device (step 310) to see if the removable nonvolatile storage device is still unlocked or if various factors (explained herein) have caused the removable nonvolatile storage device to return to a locked state, requiring the computer system to once again unlock the removable nonvolatile storage device using the steps set forth in predefined process 380 (FIG. 4).

Figure 4:
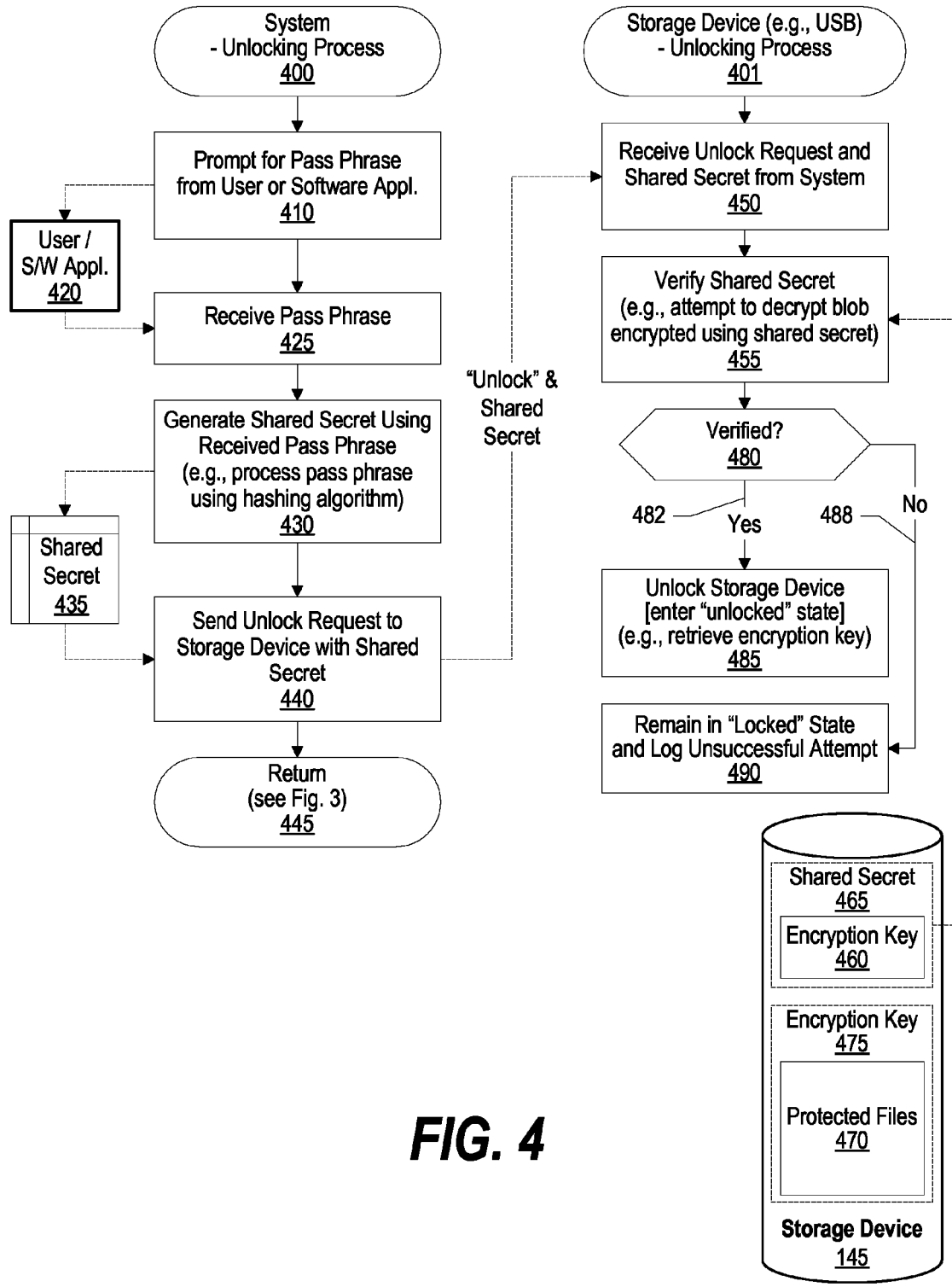
FIG. 4 is a flowchart showing steps performed between a computer system and the peripheral device in order to unlock the removable nonvolatile storage device.

FIG. 4 is a flowchart showing steps performed between a computer system and the removable nonvolatile storage device in order to unlock the removable nonvolatile storage device. This procedure is called from FIG. 3 when the computer system has checked the status of the removable nonvolatile storage device and determined that the removable nonvolatile storage device is currently locked. Computer system processing steps are shown commencing at 400 whereupon, at step 410, the user or a software application (such as a backup application) is prompted to provide a pass phrase that is needed to generate a shared secret. User or software application 420 provides a pass phrase that is received at step 425. A shared secret is generated at step 430 using the received pass phrase. In one embodiment, the shared secret is generated by processing the pass phrase using a hashing algorithm, such as SHA-256. The result of step 430 is shared secret 435. At step 440, the computer system sends an unlock request to the removable nonvolatile storage device along with the shared secret. Computer system processing thereafter returns to the calling routine (e.g., FIG. 3) at 445.

Turning now to processing performed at the removable nonvolatile storage device, such processing is shown commencing at 401 whereupon, at step 450, the removable nonvolatile storage device receives the unlock request along with the shared secret from the computer system. At step 455, the removable nonvolatile storage device attempts to verify the shared secret that was received at step 450. In one embodiment, the shared secret is verified by attempting to decrypt encryption key 460 that has been encrypted using shared secret 465. If the encryption key file is successfully decrypted, then the shared secret is verified. As shown, protected files 470 are stored in the removable nonvolatile storage device and are encrypted using the encryption key. If the encryption key is not retrieved by decrypting encryption key file 460 (using the shared secret), then the protected files cannot be retrieved nor can new protected files be written to removable nonvolatile storage device 145. A determination is made as to whether the shared secret is successfully verified (decision 480). If the shared secret is successfully verified, then decision 480 branches to "yes" branch 482 whereupon, at step 485, the removable nonvolatile storage device is unlocked and the encryption key used to encrypt/decrypt files stored on removable nonvolatile storage device 145 is retrieved and used to perform the encryption and decryption. On the other hand, if the shared secret is not successfully verified, then decision 480 branches to "no" branch 488 whereupon, at step 490, the removable nonvolatile storage device remains in a locked state and the encryption key is not retrieved and, therefore, is unavailable to retrieve or store encrypted files 470 to removable nonvolatile storage device 145. In one embodiment, a log is maintained of unsuccessful attempts to unlock the removable nonvolatile storage device.

Figure 5:
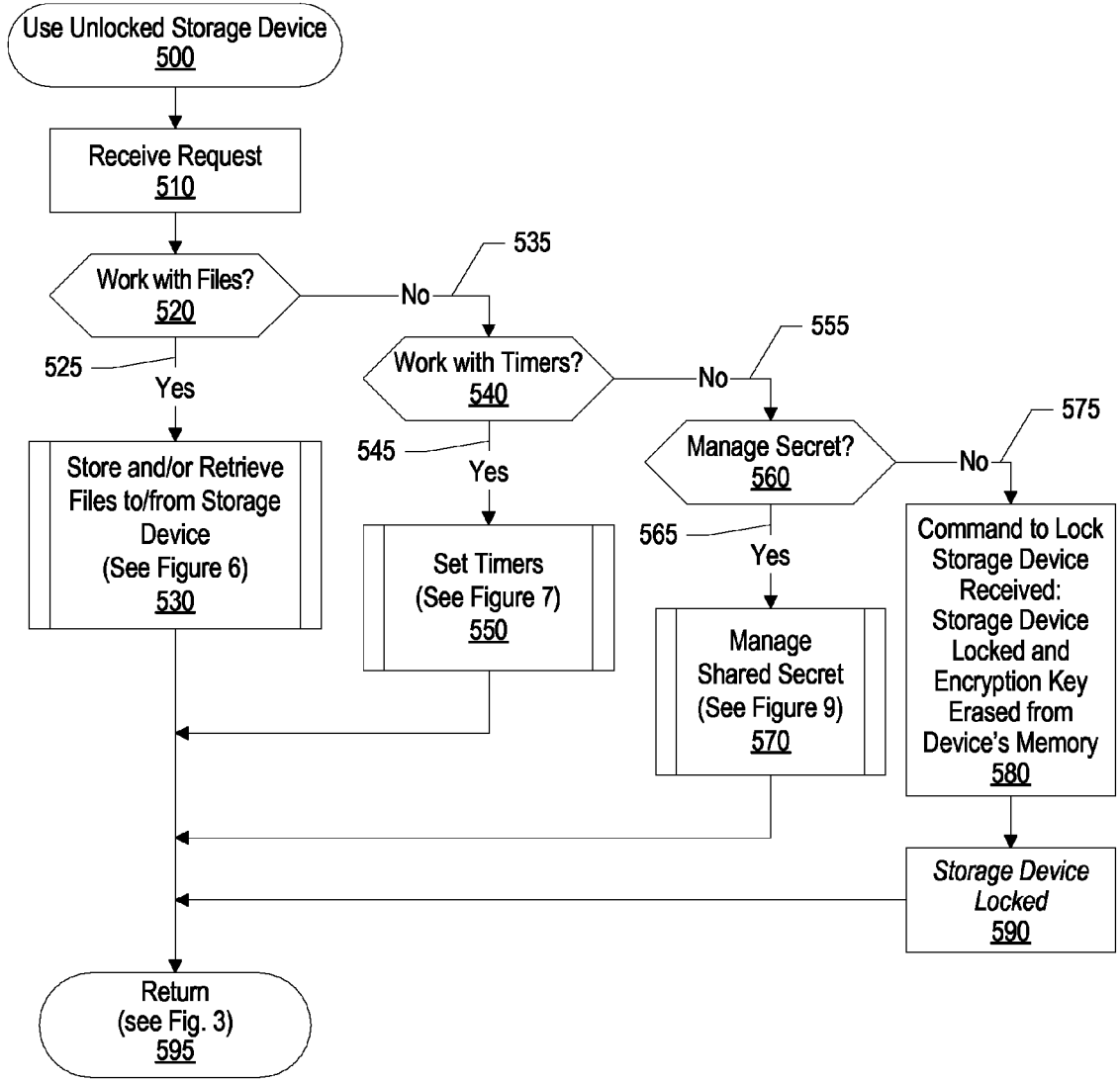
FIG. 5 is a higher level flowchart showing various actions performed by a secured, unlocked peripheral device.

FIG. 5 is a higher level flowchart showing various actions performed by a secured, unlocked removable nonvolatile storage device. Once the removable nonvolatile storage device has been unlocked, it receives requests from the computer system. Removable nonvolatile storage device processing while in an unlocked state is shown commencing at 500 whereupon, at step 510, the removable nonvolatile storage device receives a request from the computer system. A determination is made as to whether the request is to work with files (e.g., store or retrieve files) on the removable nonvolatile storage device (decision 520). If the request is to work with files on the removable nonvolatile storage device, then decision 520 branches to "yes" branch 525 whereupon, at predefined process 530, the removable nonvolatile storage device stores and retrieves files from its nonvolatile storage (see FIG. 6 and corresponding text for processing details). Processing then returns to the calling routine (e.g., FIG. 3) at 595.

Returning to decision 520, if the request is not to work with files, then decision 520 branches to "no" branch 535 whereupon another determination is made as to whether the request is to work with timers in the removable nonvolatile storage device (decision 540). As will be further explained, timers can be set to both lock the removable nonvolatile storage device at various times as well as lock the removable nonvolatile storage device when it has not been accessed for a period of time. If the request is to work with timers, then decision 540 branches to "yes" branch 545 whereupon, at predefined process 550, the removable nonvolatile storage device's timers are set (see FIG. 7 and corresponding text for processing details). Processing then returns to the calling routine (e.g., FIG. 3) at 595.

Returning to decision 540, if the request is not to work with timers, then decision 540 branches to "no" branch 555 whereupon another determination is made as to whether the request is to manage the shared secret (decision 560). As will be further explained, the shared secret can be implemented if it has not yet been established for the removable nonvolatile storage device, changed, or deleted. If the request is to manage the secret, then decision 560 branches to "yes" branch 565 whereupon, at predefined process 570, the shared secret is managed (see FIG. 9 and corresponding text for processing details). Processing then returns to the calling routine (e.g., FIG. 3) at 595.

Returning to decision 560, if the request is not to work with files, timers, or the shared secret, then the request is to lock the removable nonvolatile storage device. If the request is to lock the removable nonvolatile storage device, then decision 560 branches to "no" branch 575 whereupon, at step 580, the removable nonvolatile storage device is locked and the previously retrieved encryption key that was retrieved from the file using the shared secret is erased from the removable nonvolatile storage device's memory so that the encryption key is no longer available to retrieve or store protected files to the removable nonvolatile storage device's nonvolatile storage. After the encryption key has been erased from memory, the encryption key is still stored in an encrypted format on the removable nonvolatile storage device's nonvolatile storage, but the shared secret is needed in order to retrieve the encryption key and unlock the removable nonvolatile storage device. At step 590, the removable nonvolatile storage device is shown being in a "locked" state so that the shared secret needs to be provided before the removable nonvolatile storage device once again enters the "unlocked" state. Processing then returns to the calling routine (e.g., FIG. 3) at 595, however, now the removable nonvolatile storage device is in a "locked" state rather than being in an "unlocked" state.

Figure 6:
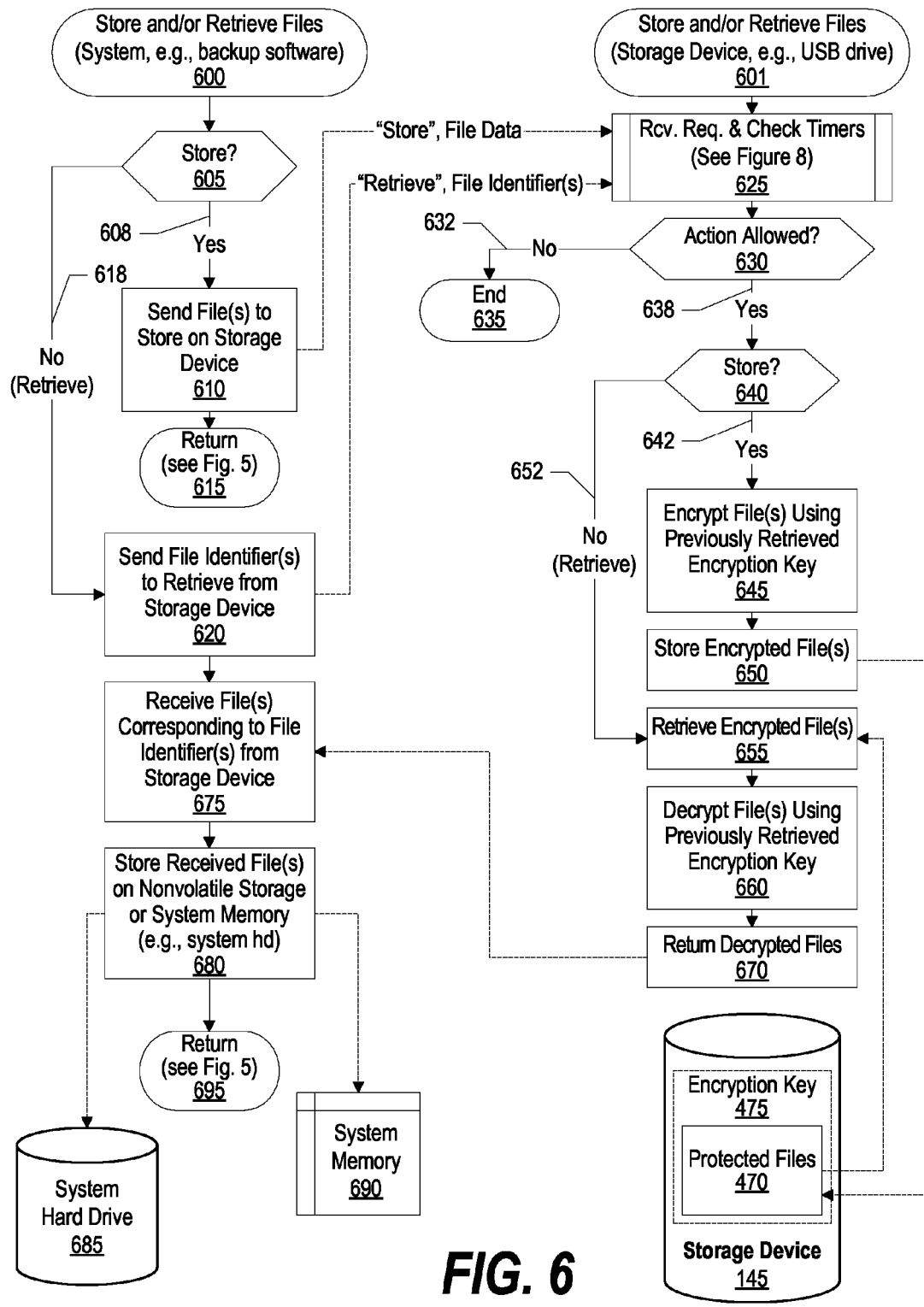
FIG. 6 is a flowchart showing steps performed by a computer system and the removable nonvolatile storage device to access the peripheral device.

FIG. 6 is a flowchart showing steps performed by a computer system and the removable nonvolatile storage device to access files on the removable nonvolatile storage device. Computer system processing is shown commencing at 600 and processing performed by the removable nonvolatile storage device is shown commencing at 601. Computer system processing commences at 600 whereupon a determination is made as to whether the request is to store or retrieve files to or from the removable nonvolatile storage device (decision 605). If the request is to store files to the removable nonvolatile storage device then decision 605 branches to "yes" branch 608 whereupon, at step 610, the files to be stored are sent to the removable nonvolatile storage device. Processing then returns to the calling routine (see FIG. 5) at 615. On the other hand, if the access request is to retrieve files from the removable nonvolatile storage device, then decision 605 branches to "no" branch 618 whereupon, at step 620 the file identifiers corresponding to the files that are being retrieved are sent to the removable nonvolatile storage device.

Figure 8:
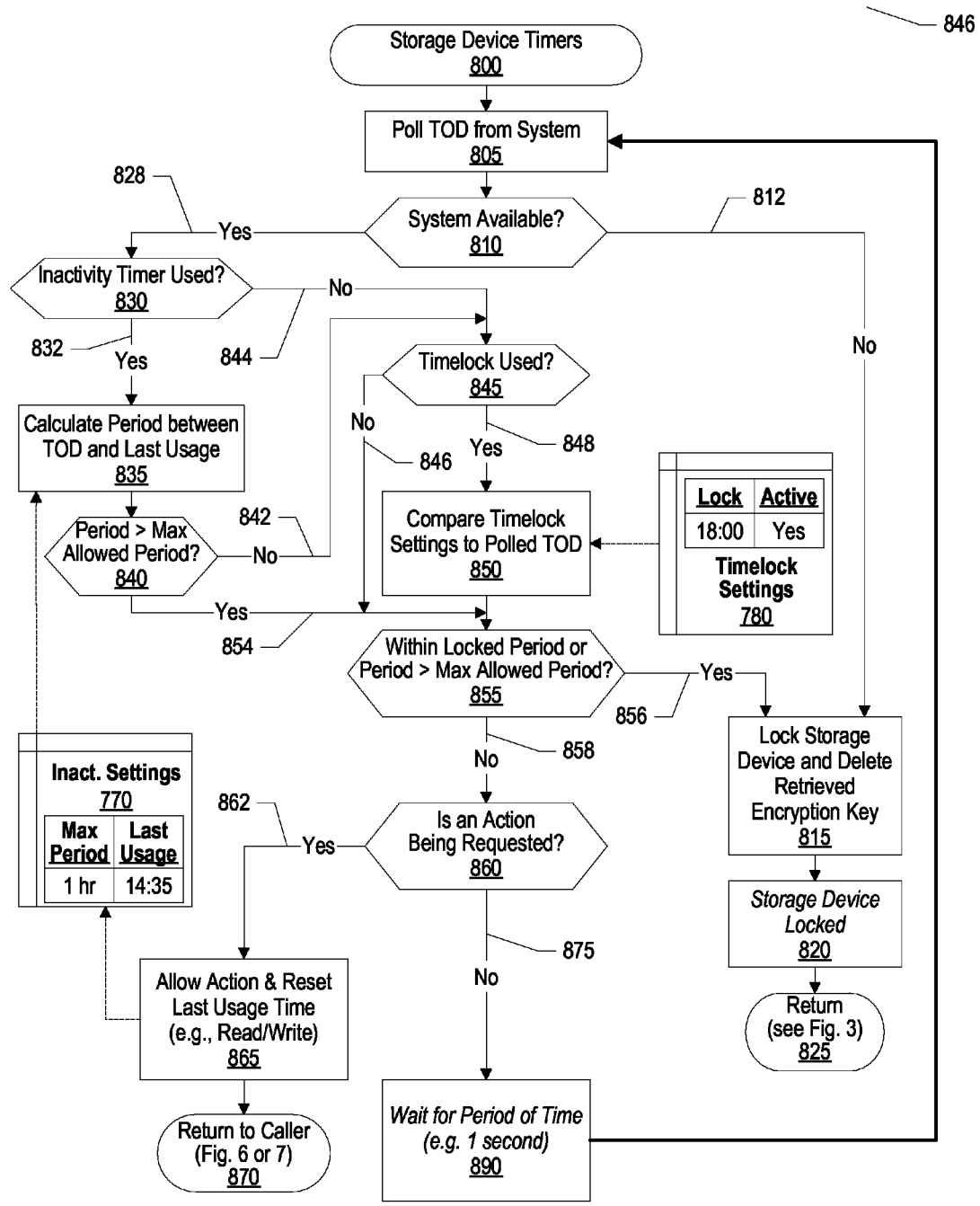
FIG. 8 is a flowchart showing steps performed by the peripheral device to act on various timer settings.

Turning now to processing performed by the removable nonvolatile storage device, processing commences at 601 whereupon, at predefined process 625, the removable nonvolatile storage device receives the request (either a storage or a retrieval request) and checks timers (see FIG. 8 and corresponding text for details regarding the checking of timers at the removable nonvolatile storage device). A determination is made as to whether the requested action is allowed based on the check of the timers as described in FIG. 8 (decision 630). If the action is not allowed, then decision 630 branches to "no" branch 632 whereupon removable nonvolatile storage device processing ends at 635. On the other hand, if the action is allowed, then decision 630 branches to "yes" branch 638. Another determination is made as to whether the requested action is to store one or more files (decision 640). If the requested action is to store one or more files, then decision 640 branches to "yes" branch 642 whereupon, at step 645 the files are encrypted using the previously retrieved encryption key and, at step 650, the encrypted files are stored as protected files 470 in the storage device 145's nonvolatile storage. Returning to decision 640, if the request is to retrieve one or more files, decision 640 branches to "no" branch 652 whereupon, at step 655 the encrypted files corresponding to the requested file identifiers are retrieved from protected files 470 stored in removable nonvolatile storage device 145. At step 660, the retrieved files are decrypted using the encryption key that was previously retrieved when the removable nonvolatile storage device was unlocked. At step 670, the decrypted files are returned to the computer system.

Returning to computer system processing, if the request was to retrieve files, at step 675 the decrypted files are received from the removable nonvolatile storage device. At step 680, the received files are stored on a nonvolatile storage area, such as hard drive 690, or are stored in the memory of the computer system 690. Computer system processing then returns to the calling routine (see FIG. 5) at 695.

Figure 7:
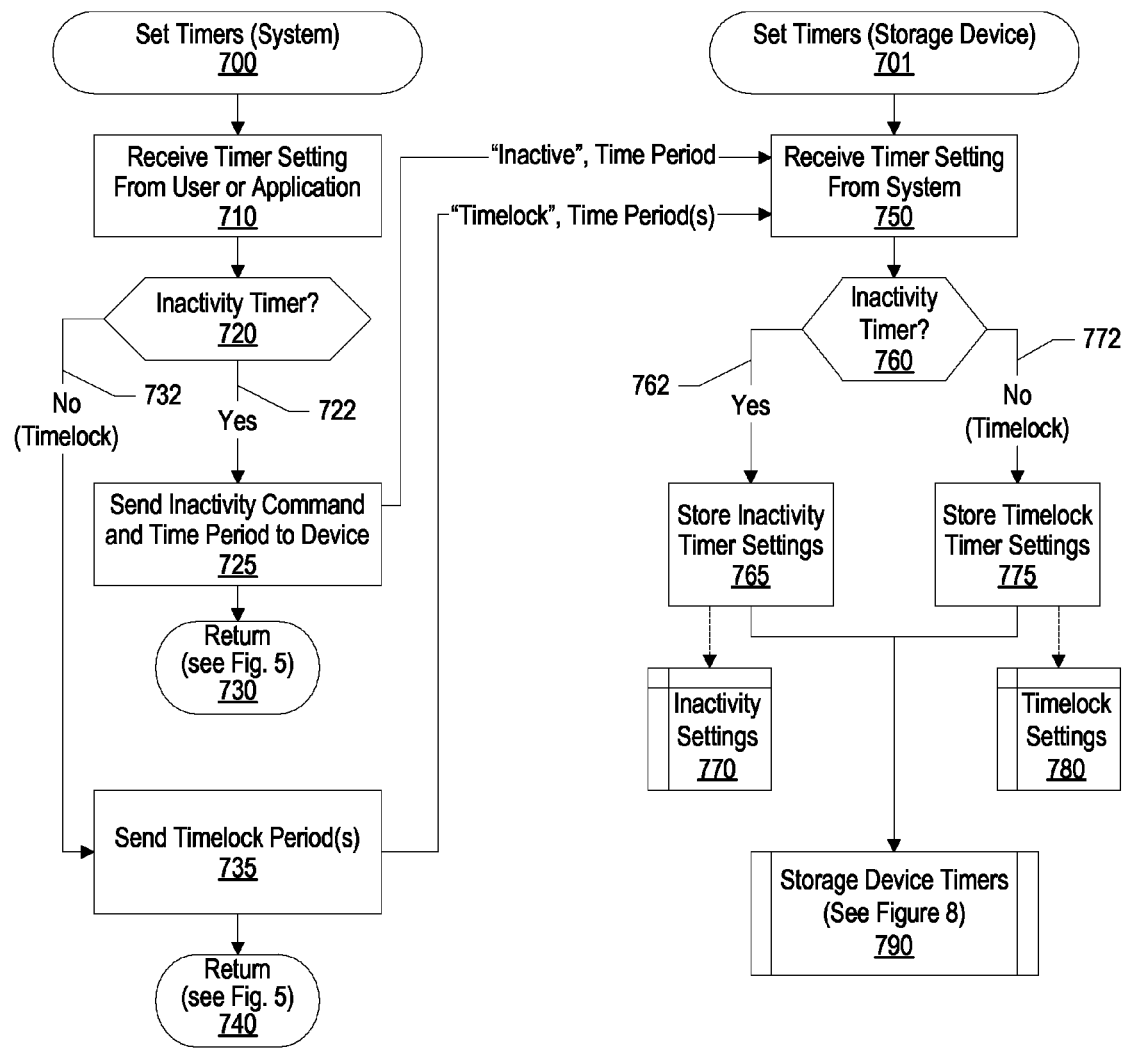
FIG. 7 is a flowchart showing steps taken to set timers on the peripheral device.

FIG. 7 is a flowchart showing steps taken to set timers on the removable nonvolatile storage device. Computer system processing commences at 700 whereupon, at step 710 a timer setting is received from a user or a software application that is running on the computer system. A determination is made as to whether the timer setting is an inactivity timer setting (decision 720). If the timer setting is an inactivity timer setting, then decision 720 branches to "yes" branch 722 whereupon, at step 725, an inactivity timer command and an inactivity time period threshold are sent to the removable nonvolatile storage device. The inactivity time period threshold is the amount of time the removable nonvolatile storage device waits until entering into a locked state. For example, if the user sets the inactivity time period threshold to be two hours, then if the removable nonvolatile storage device is not accessed for a two hour period it enters a locked state that is more fully described in FIG. 8. Returning to decision 720, if an inactivity timer setting is not being set, then decision 720 branches to "no" branch 732 whereupon, at step 735, one or more timelock periods are sent to the removable nonvolatile storage device. A timelock period is a period of time during which the removable nonvolatile storage device enters a locked state. For example, if the user normally leaves the office at 6:00 PM and schedules a backup routine to backup documents and other data to the removable nonvolatile storage device at 3:00 AM, then a timelock could be set for 6:00 PM to 3:00 AM. If the backup routine does not take longer than an hour to execute, another timelock setting could be set to lock the removable nonvolatile storage device at 4:00 AM until the user returns to work at 8:00 AM. After the computer system timer steps have been processed, control returns to the calling routine (see FIG. 5) at 740.

Turning now to processing performed by the removable nonvolatile storage device, such processing commences at 701 whereupon, at step 750, the timer setting is received from the computer system. A determination is made as to whether the timer setting is for an inactivity timer (decision 760). If the timer setting is for an inactivity timer, then decision 760 branches to "yes" branch 762 whereupon, at step 765, inactivity settings are stored in data store 770 at the removable nonvolatile storage device. On the other hand, if the timer setting is not for an inactivity timer, then decision 760 branches to "no" branch 772 whereupon, at step 775, the timelock settings received from the computer system are stored in timelock settings data store 780 stored at the removable nonvolatile storage device. After the timer settings have been stored, removable nonvolatile storage device processing performs predefined process 790 which processes the various storage device timers configured for the removable nonvolatile storage device (see FIG. 8 and corresponding text for processing details).

FIG. 8 is a flowchart showing steps performed by the removable nonvolatile storage device to act on various timer settings. Processing commences at 800 whereupon, at step 805 the removable nonvolatile storage device polls a time-of-day (TOD) from the attached computer system. Step 805 is performed periodically (e.g., every second) to check whether the removable nonvolatile storage device is still attached to the computer system. A determination is made as to whether the computer system is available (decision 810). If the computer system is no longer available, then decision 810 branches to "no" branch 812 whereupon, at step 815, the removable nonvolatile storage device is locked by erasing the encryption key from the removable nonvolatile storage device's memory. By step 820 the removable nonvolatile storage device is in a locked state and can only be unlocked by the shared secret being provided to the removable nonvolatile storage device from a computer system. Processing then returns to FIG. 3 to wait for entry of the shared secret at 825.

Returning to decision 810, if the system is available, then decision 810 branches to "yes" branch 828 whereupon a determination is made as to whether an inactivity timer is being used by the system (decision 830). If an inactivity timer is being used, then decision 830 branches to "yes" branch 832 whereupon, at step 835, a period is calculated between the current time-of-day and the last time that the removable nonvolatile storage device was accessed. A determination is then made as to whether the calculated period exceeds the inactivity time period threshold (decision 840). If the calculated period does not exceed (is within) the inactivity time period threshold, then decision 840 branches to "no" branch 842 to continue evaluating timers. On the other hand, if the calculated period exceeds (is outside) the inactivity time period threshold, then decision 840 branches to "yes" branch 854 and the removable nonvolatile storage device will be locked.

Returning to decision 830, if either an inactivity timer is not being used or if the inactive time does not exceed the set threshold, then a determination is made as to whether a timelock is being used (decision 845). If a timelock is not being used, then decision 845 branches to "no" branch 846 bypassing step 850. On the other hand, if a timelock is being used, then decision 845 branches to "yes" branch 848 whereupon, at step 850, timelock setting 780 is compared to the current time-of-day. In the example shown, if the time-of-day is after between 6:00 PM then a timelock applies. In one embodiment a flag is maintained to indicate whether the timelock has already been activated for the particular day so that the timelock is not repeatedly triggered after the user (or application) has provided the pass phrase (shared secret). A determination is made based on the comparison as to whether the current time-of-day is after the timelock (decision 855). If the current time-of-day has reached the timelock period or if the amount of inactive time exceeds the inactivity timer period, then decision 855 branches to "yes" branch 856 whereupon, at step 815, the removable nonvolatile storage device is locked by erasing the encryption key from the removable nonvolatile storage device's memory. By step 820 the removable nonvolatile storage device is in a locked state and can only be unlocked by the shared secret being provided to the removable nonvolatile storage device from a computer system. Processing then returns to FIG. 3 to wait for entry of the shared secret at 825.

Returning to decision 855, if the time-of-day has not entered a timelock period and the inactivity period does not exceed an allowed maximum inactivity period, then decision 855 branches to "no" branch 858 whereupon a determination is made as to whether an action has been requested (decision 860). For example, if a storage or retrieval request was being made (see predefined process 625 in FIG. 6), then FIG. 8 was called to check if any of the timers (inactivity timer and timelock) have expired. If an action has been requested, then decision 860 branches to "yes" branch 862 whereupon, at step 865, the action is permitted and the current time-of-day is stored as the last usage time. Processing then returns to the calling routine (see FIG. 6 or 7) at 870. Returning to decision 860, if an action has not been requested, then decision 860 branches to "no" branch 875 whereupon, at step 890, the system waits for a period of time, such as one second, before looping back to determine if the system is available and whether a timer has been triggered. While the removable nonvolatile storage device is not being used (is inactive), this looping continues until either the system is unavailable (decision 810 branching to "no" branch 812) or until one of the timers is triggered (decision 855 branching to "yes" branch 856), at which time the removable nonvolatile storage device is locked. As previously explained, when in a locked state, the removable nonvolatile storage device remains in the locked state until the shared secret is provided.

Figure 9:
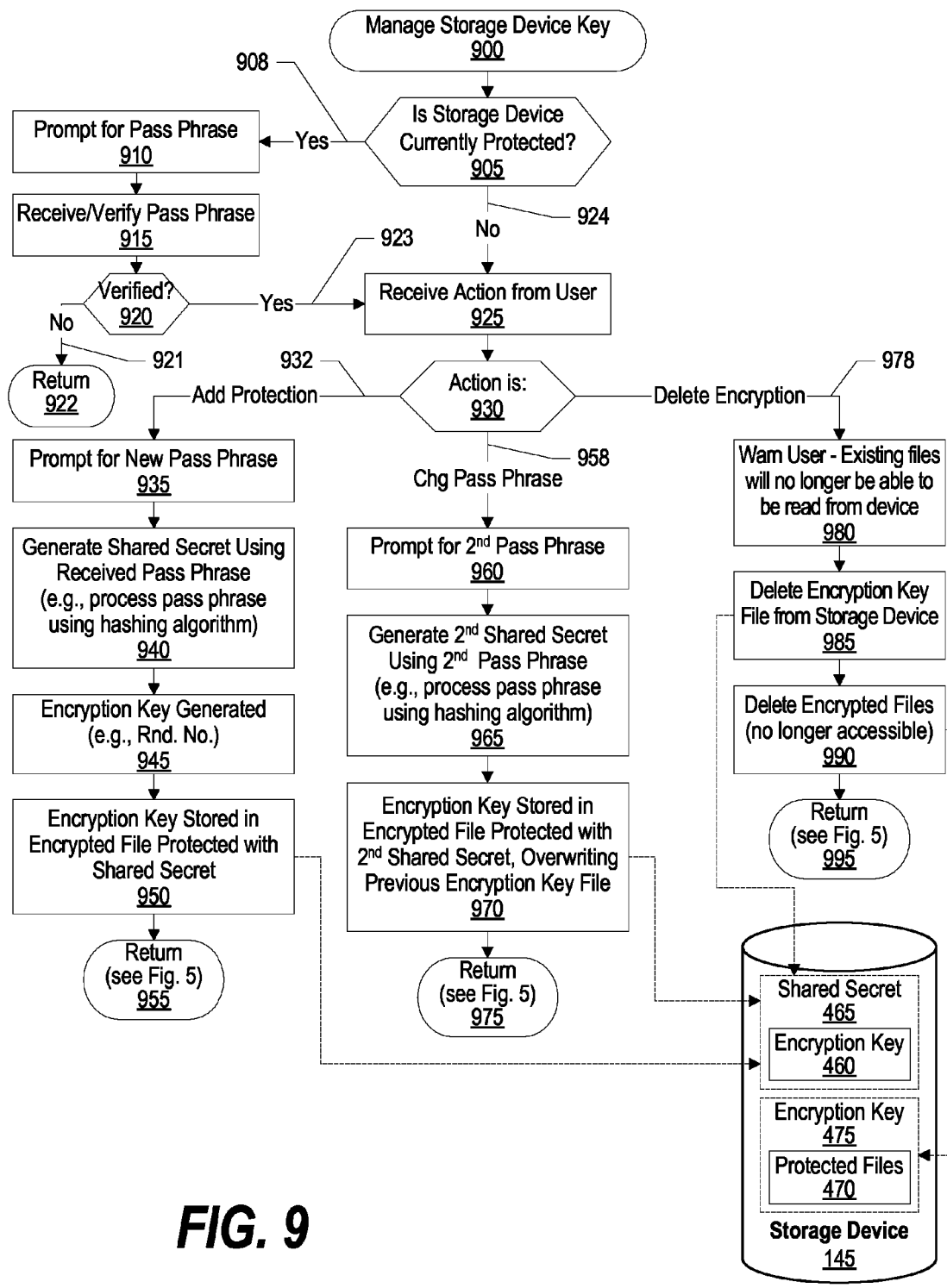
FIG. 9 is a flowchart showing steps taken to manage the shared secret used by the peripheral device.

FIG. 9 is a flowchart showing steps taken to manage the shared secret used by the removable nonvolatile storage device. Processing commences at 900 whereupon a determination is made as to whether the removable nonvolatile storage device is currently being protected using a shared secret (decision 905). If the removable nonvolatile storage device is already being protected with a shared secret, then decision 905 branches to "yes" branch 908 whereupon, at step 910 the pass phrase is requested from the computer system (e.g., a user or an application) and at step 915 the pass phrase is received and verified (e.g., using a hashing algorithm to generate a hash result that is compared to the shared secret). A determination is made as to whether the pass phrase that was provided is verified (decision 920). If the pass phrase is not verified, then decision 920 branches to "no" branch 921 whereupon processing returns at 922. On the other hand, if the pass phrase is verified, then decision 920 branches to "yes" branch 923.

If either the removable nonvolatile storage device is not currently being protected by a shared secret (decision 905 branching to "no" branch 924) or if the correct pass phrase is entered (decision 920 branching to "yes" branch 923), then, at step 925 an action relating to the shared secret is received from the user. Decision 930 branches based upon the requested action. If the requested action is to "add" shared secret protection to the removable nonvolatile storage device, then decision 930 branches to "add protection" branch 932 whereupon, at step 935, the user is prompted for a new pass phrase. At step 940, a shared secret is generated based upon the pass phrase provided by the user (e.g., by using a hashing algorithm such as the SHA-256 algorithm). At step 945, an encryption key, such as a random number, is generated either at the removable nonvolatile storage device or at the computer system. At step 950, the encryption key is stored in a file that is encrypted using the shared secret. Processing then returns to the calling routine (see FIG. 5) at 955.

Returning to decision 930, if the action is to change the pass phrase, then decision 930 branches to branch 958 whereupon, at step 960 the user is prompted for a second pass phrase different than the original pass phrase. At step 965, a second shared secret is generated using the second pass phrase (e.g., using the hashing algorithm). The encryption key is now stored in a file that is encrypted using the second pass phrase. This new encrypted file overwrites the first encrypted file that stored the encryption key. Processing then returns to the calling routine (see FIG. 5) at 975.

Returning once again to decision 930, if the action is to delete encryption on the removable nonvolatile storage device, then decision 930 branches to branch 978. This branch is taken in order to effectively delete all protected files on the removable nonvolatile storage device. At step 980 the user is warned that by deleting the encryption key all protected files will be effectively erased. At step 985, assuming that the user wishes to continue, the encryption key file is deleted from the removable nonvolatile storage device. Because the encryption key is no longer available, protected files 470 are no longer accessible because the encryption key has been destroyed. At step 990, protected files 470 are deleted from the removable nonvolatile storage device in order to reclaim space. Processing then returns to the calling routine (see FIG. 5) at 995.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   establishing a shared secret between a computer system and a peripheral device;
   setting a timelock at the peripheral device, the timelock including one or more timelock periods during which the peripheral device is in a locked state;
   locking the peripheral device after establishing the shared secret, the locking performed without intervention from a user of the computer system, the locking being for the duration of a timelock period;
   after the locking and before expiration of the timelock period, receiving an unlock request and the shared secret at the peripheral device;
   in response to receiving the unlock request, verifying the shared secret, by the peripheral device;
   in response to successful verification of the shared secret, unlocking the peripheral device to allow accesses to the peripheral device using an encryption key that is made available by the verified shared secret;
   in response to unsuccessful verification of the shared secret, prohibiting use of the peripheral device, wherein the peripheral device remains locked;
   after expiration of the timelock period and before a start of a subsequent timelock period, automatically permitting use of the peripheral device without provision of the shared secret; and
   after unlocking the peripheral device:
      periodically polling the computer system from the peripheral device in order to determine whether the computer system is physically connected to the peripheral device; and
      locking the peripheral device in response to determining that the computer system is not connected to the peripheral device.

2. The method of claim 1 further comprising:
   setting an inactivity timer at the peripheral device, the inactivity timer including an inactivity time period threshold;
   after unlocking the peripheral device:
      receiving an access request at the peripheral device from the computer system;
      comparing a current timestamp of the received access request to a last used timestamp indicating when the peripheral device was last accessed, the comparing resulting in a current time period;
      in response to the current time period being within the inactivity time period threshold:
         resetting the last used timestamp to be equal to the current timestamp; and allowing use of the peripheral device; and
      in response to the current time period being outside the inactivity time period threshold:
         requesting the shared secret from the computer system;
         allowing access to the peripheral device in response to receiving the shared secret; and
         disallowing use of the peripheral device in response to not receiving the shared secret.

3. The method of claim 1 further comprising:
   after unlocking the peripheral device:
      receiving a usage request at the peripheral device from the computer system;
      retrieving a current time at the peripheral device;
      determining whether the retrieved current time falls within one of the timelock periods;
   in response to the current time period being within one of the timelock periods:
      requesting the shared secret from the computer system;
      allowing use of the peripheral device in response to receiving the shared secret; and
      disallowing use of the peripheral device in response to not receiving the shared secret; and
   allowing use of the peripheral device in response to the current time period being outside each of the timelock periods.

4. The method of claim 1 wherein the encryption key is stored in an encryption key file on the peripheral device, and wherein the peripheral device is selected from the group consisting of a removable nonvolatile storage device and a printer.

5. The method of claim 1 further comprising:
   setting an inactivity timer at the peripheral device, wherein the inactivity timer includes an inactivity time period;
   after the setting, receiving a usage request after unlocking the peripheral device;
   processing the received usage request by:
      polling the computer system for a time of day (timestamp) from the peripheral device;
      locking the peripheral device in response to determining that the computer system is not connected to the peripheral device;
      in response to determining that the computer system is connected to the peripheral device:
         allowing use of the peripheral device in response to the polled timestamp being within the inactivity time period threshold and the polled timestamp being outside each of the timelock periods; and
         in response to either the polled timestamp being outside the inactivity time period threshold or the polled timestamp being within any of the timelock periods:
            requesting, by the peripheral device, the shared secret from the computer system;
            receiving a second shared secret from the computer system;
            allowing use of the peripheral device in response to determining that the second shared secret matches the shared secret; and disallowing use of the peripheral device in response to determining that the second shared secret does not match the shared secret.

6. The method of claim 1 further comprising:
receiving a pass phrase at the computer system; and
generating the shared secret by processing the received pass phrase using a hashing algorithm, wherein the shared secret is a result of the hashing algorithm.

7. A peripheral device comprising:
one or more processors;
a memory accessible by at least one of the processors;
a nonvolatile storage area accessible by at least one of the processors;
a set of instructions stored in the memory and executed by at least one of the processors in order to perform actions of:
establishing a shared secret between a computer system and a peripheral device;
setting a timelock at the peripheral device, the timelock including one or more timelock periods during which the peripheral device is in a locked state;
locking the peripheral device after establishing the shared secret, the locking performed without intervention from a user of the computer system, the locking being for the duration of a timelock period;
after the locking and before expiration of the timelock period, receiving an unlock request and the shared secret at the peripheral device;
in response to receiving the unlock request, verifying the shared secret, by the peripheral device;
in response to successful verification of the shared secret, unlocking the peripheral device to allow accesses to the peripheral device using an encryption key that is made available by the verified shared secret;
in response to unsuccessful verification of the shared secret, prohibiting use of the peripheral device, wherein the peripheral device remains locked;
after expiration of the timelock period and before a start of a subsequent timelock period, automatically permitting use of the peripheral device without provision of the shared secret; and
after unlocking the peripheral device:
periodically polling the computer system from the peripheral device in order to determine whether the computer system is physically connected to the peripheral device; and
locking the peripheral device in response to determining that the computer system is not connected to the peripheral device.

8. The peripheral device of claim 7, wherein the set of instructions causes the processors to perform further actions comprising:
setting an inactivity timer at the peripheral device, the inactivity timer including an inactivity time period threshold;
after unlocking the peripheral device:
receiving a usage request at the peripheral device from the computer system;
comparing a current timestamp of the received access request to a last used timestamp indicating when the peripheral device was last accessed, the comparing resulting in a current time period;
in response to the current time period being within the inactivity time period threshold:
resetting the last used timestamp to be equal to the current timestamp; and
allowing use of the peripheral device; and
in response to the current time period being outside the inactivity time period threshold:
requesting the shared secret from the computer system;
allowing use of the peripheral device in response to receiving the shared secret; and
disallowing use of the peripheral device in response to not receiving the shared secret.

9. The peripheral device of claim 7, wherein the set of instructions causes the processors to perform further actions comprising:
after unlocking the peripheral device:
receiving a usage access request at the peripheral device from the computer system;
retrieving a current time at the peripheral device;
determining whether the retrieved current time falls within one of the timelock periods;
in response to the current time period being within one of the timelock periods:
requesting the shared secret from the computer system;
allowing use of the peripheral device in response to receiving the shared secret; and
disallowing use of the peripheral device in response to not receiving the shared secret; and
allowing use of the peripheral device in response to the current time period being outside each of the timelock periods.

10. The peripheral device of claim 7 wherein an encryption key is stored in an encryption key file on the peripheral device, and wherein the peripheral device is selected from the group consisting of a removable nonvolatile storage device and a printer.

11. The peripheral device of claim 7, wherein the set of instructions causes the processors to perform further actions comprising:
setting an inactivity timer at the peripheral device;
after the setting, receiving a usage request after unlocking the peripheral device;
processing the received usage request by:
polling the computer system for a time of day (timestamp) from the peripheral device;
locking the peripheral device in response to determining that the computer system is not connected to the peripheral device;
in response to determining that the computer system is connected to the peripheral device:
allowing use of the peripheral device in response to the polled timestamp being within the inactivity time period threshold and the polled timestamp being outside each of the timelock periods; and
in response to either the polled timestamp being outside the inactivity time period threshold or the polled timestamp being within any of the timelock periods:
requesting, by the peripheral device, the shared secret from the computer system;
receiving a second shared secret from the computer system;
allowing use of the peripheral device in response to determining that the second shared secret matches the shared secret; and
disallowing use of the peripheral device in response to determining that the second shared secret does not match the shared secret.

12. The peripheral device of claim 7, wherein the set of instructions causes the processors to perform further actions comprising:
receiving a pass phrase at the computer system; and generating the shared secret by processing the received pass phrase using a hashing algorithm, wherein the shared secret is a result of the hashing algorithm.

13. A computer program product stored in a computer readable storage device, comprising functional descriptive material that, when executed by an information handling system, causes the information handling system to perform actions that include:

establishing a shared secret between a computer system and a peripheral device;

setting a timelock at the peripheral device, the timelock including one or more timelock periods during which the peripheral device is in a locked state;

locking the peripheral device after establishing the shared secret, the locking performed without intervention from a user of the computer system for a first timelock period;

after the locking and during the first timelock period, receiving an unlock request and the shared secret at the peripheral device;

in response to receiving the unlock request and determining that the first timelock period is not expired, verifying the shared secret, by the peripheral device;

in response to successful verification of the shared secret, unlocking the peripheral device to allow accesses to the peripheral device using an encryption key that is made available by the verified shared secret;

in response to unsuccessful verification of the shared secret, prohibiting use of the peripheral device, wherein the peripheral device remains locked;

responsive to an unlock request after expiration of the first timelock period and prior to commencement of a second timelock period, responsive to determining that no timelock period is invoked, automatically permitting access to the peripheral device without verifying the shared secret until commencement of the second timelock period, and then not permitting access responsive to an unlock request received during the second timelock period absent verification of a shared secret and;

after unlocking the peripheral device:
periodically polling the computer system from the peripheral device in order to determine whether the computer system is physically connected to the peripheral device; and
locking the peripheral device in response to determining that the computer system is not connected to the peripheral device.

14. The computer program product of claim 13 further comprising functional descriptive material that causes the data processing system to perform additional actions that include:

setting an inactivity timer at the peripheral device, the inactivity timer including an inactivity time period threshold;

after unlocking the peripheral device:
receiving an access request at the peripheral device from the computer system;
comparing a current timestamp of the received access request to a last used timestamp indicating when the peripheral device was last accessed, the comparing resulting in a current time period;
in response to the current time period being within the inactivity time period threshold:
resetting the last used timestamp to be equal to the current timestamp; and
allowing use of the peripheral device; and
in response to the current time period being outside the inactivity time period threshold:
requesting the shared secret from the computer system;
allowing access to the peripheral device in response to receiving the shared secret; and
disallowing use of the peripheral device in response to not receiving the shared secret.

15. The computer program product of claim 13 further comprising functional descriptive material that causes the data processing system to perform additional actions that include:

after unlocking the peripheral device:
receiving a usage request at the peripheral device from the computer system;
retrieving a current time at the peripheral device;
determining whether the retrieved current time falls within one of the timelock periods;
in response to the current time period being within one of the timelock periods:
requesting the shared secret from the computer system;
allowing use of the peripheral device in response to receiving the shared secret; and
disallowing use of the peripheral device in response to not receiving the shared secret; and
allowing use of the peripheral device in response to the current time period being outside each of the timelock periods.

16. The computer program product of claim 13 wherein the encryption key is stored in an encryption key file on the peripheral device, and wherein the peripheral device is selected from the group consisting of a removable nonvolatile storage device and a printer.

17. The computer program product of claim 13, further comprising functional descriptive material that causes the data processing system to perform additional actions that include:

receiving a pass phrase at the computer system; and
generating the shared secret by processing the received pass phrase using a hashing algorithm, wherein the shared secret is a result of the hashing algorithm.

* * * * *